(No Model.)

G. H. BUTLER.
DETACHING DEVICE FOR WHEEL HUBS.

No. 514,348. Patented Feb. 6, 1894.

Witnesses:
Robert Everitt
Thos. A. Tynan

Inventor:
George H. Butler.
By James L. Norris
Atty.

UNITED STATES PATENT OFFICE.

GEORGE H. BUTLER, OF CORSICANA, TEXAS.

DETACHING DEVICE FOR WHEEL-HUBS.

SPECIFICATION forming part of Letters Patent No. 514,348, dated February 6, 1894.

Application filed May 25, 1893. Serial No. 475,473. (No model.)

*To all whom it may concern:*

Be it known that I, GEORGE H. BUTLER, a citizen of the United States, residing at Corsicana, in the county of Navarro and State of Texas, have invented new and useful Improvements in Nut Screwing and Unscrewing Attachments for Wheel-Hubs, of which the following is a specification.

This invention has for its object to provide a wheel-hub with a novel attachment adapted to be quickly moved or thrown into engagement with the axle-nut for removing the latter by the rotation of the wheel, whereby the inconvenience of carrying and manipulating an ordinary nut wrench is entirely avoided, and the devices for screwing and unscrewing the axle nut are carried by the wheel-hub, and are always in proper position for immediate use whenever it is necessary to detach the nut.

The invention also has for its object to provide a novel hub attachment which can be utilized to unscrew the axle nut by the rotation of the wheel, and will securely hold the nut in the proper position after the wheel is removed from the spindle of the axle, whereby it is possible to remove the nut and subsequently apply it to the axle without handling the same.

To accomplish these objects my invention consists in the features of construction and the combination or arrangement of parts hereinafter described and claimed, reference being made to the accompanying drawings, in which—

Figure 1:
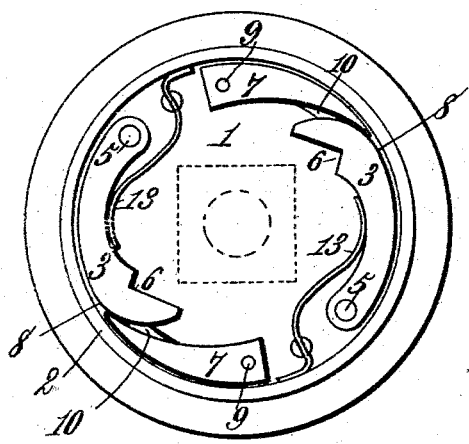
Figure 2:
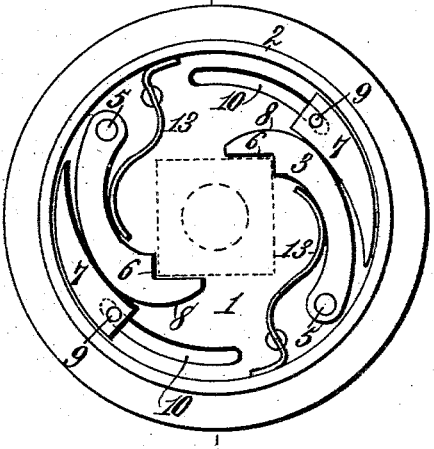
Figure 3:
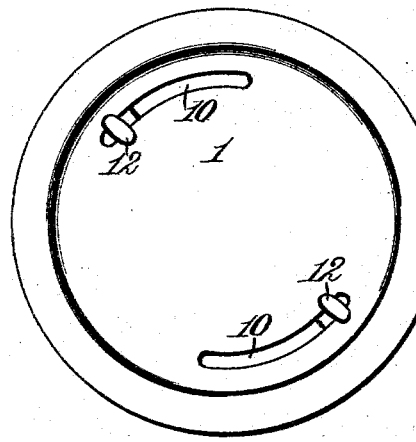
Figure 4:
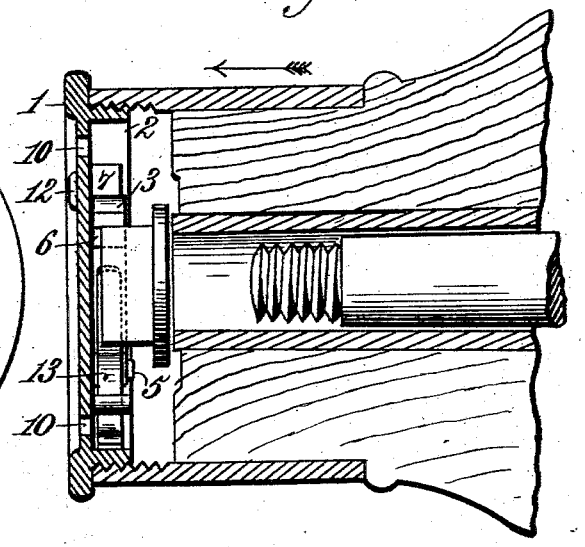

Figure 1 is a plan view, looking at the inside of my improved attachment for removing and replacing axle nuts, and showing the pawls or dogs in normal position. Fig. 2 is a similar view, showing the pawls or dogs adjusted for engagement with the axle nut. Fig. 3 is a plan view, looking at the outside of the attachment; and Fig. 4 is a sectional view, taken on the line 4—4, Fig. 1.

In order to enable those skilled in the art to make and use my invention, I will now describe the same in detail, referring to the drawings, wherein—

The numeral 1 indicates a pawl or dog-holder, which, as here shown, is composed of a disk or cap-plate, having an externally screw-threaded nipple 2, adapted to screw into engagement with internal screw threads of a hub band in such manner that when the attachment is in proper position, the axle nut will enter the nipple to be engaged by pawls or dogs 3 carried by the disk or cap-plate. The pawls or dogs are pivoted at one end, as at 5, to the disk or cap-plate, and at their opposite ends are formed with notches or recesses 6 adapted to engage the corners of an angular axle-nut for turning the latter to screw or unscrew the same. The pawls or dogs are designed to normally lie in such position that the wheel can rotate forwardly without the pawls or dogs engaging or touching the axle-nut, but the pawls or dogs are susceptible of being moved at will in an inward direction, so that the notches or recesses 6 can be caused to engage the nut for unscrewing the latter if the wheel be rotated backward.

For the purpose of moving the pawls or dogs radially, I may employ any suitable devices, but, as here illustrated, this result is accomplished through the medium of pawl or dog-operating blocks or slides 7, bearing against eccentrically formed outer edges 8 of the pawls or dogs, and susceptible of sliding in a circular path, so that when the blocks or slides are moved in one direction they will operate upon the pawls or dogs to press them inwardly to the position indicated in Fig. 2, in which position the angular notches or recesses 6 of the pawls or dogs will engage the axle-nut, and thus render it possible to unscrew the nut by backward rotation of the wheel. To move the blocks or slides, they are each provided with a pin 9, extending through a curved slot 10 in the disk or cap-plate of the attachment, and provided at the outer end with a knob or other suitable handle 12 adapted to be operated by the fingers, so that by moving the handle in the proper direction the blocks or slides 7 will be caused to press the notched extremities of the pawls or dogs in an inward direction to engage the axle-nut. If the handle 12 be moved in the reverse direction the pawls or dogs are permitted to move away from engagement with the axle-nut; and to facilitate this movement of the pawls or dogs they are operated upon by suitable springs 13, preferably composed of strips of elastic or spring metal secured at one extremity to the disk or cap-plate of the attachment, and bearing at their opposite extremities against the inner edges of the pawls or dogs. The circular slots 10 are concentric with the center of the disk or cap-plate of the attachment, and where this arrangement is employed the blocks or slides 7 should be wedge shaped, so that they will act properly upon the pawls or dogs to press their notched ends into position to engage the corners of an angular axle-nut.

The attachment described and shown is designed to be detachably applied to a hub band, and for this purpose the nipple 3 is externally screw-threaded, and the usual hub-band is internally screw-threaded; but I do not confine myself to this particular construction, as other means may be provided for connecting the attachment with the hub-band, so that the former is always in proper position for immediate use whenever it is desirable to unscrew the axle-nut. It will be obvious that when the nut is unscrewed, it is held centrally by the pawls or dogs, and consequently when the wheel is removed from the axle-spindle the nut is properly maintained in the position for screwing onto the spindle when the wheel is replaced. By connecting the attachment to the hub-band the rotation of the wheel effects the screwing and unscrewing of the nut, and it is possible to entirely dispense with the employment of an ordinary nut wrench, which is usually not at hand when required for use.

I have illustrated the pawls or dogs as pivoted and adapted to swing on their pivots, but they may be otherwise arranged to move radially for engaging and disengaging the axle-nut.

I have described a pair of pawls or dogs mounted on the holder, but a single pawl or dog might be employed, although such construction would not, in the absence of other special devices, hold the nut in correct position when the wheel is removed from the axle spindle.

Having thus described my invention, what I claim is—

1. A nut-screwing and unscrewing attachment for wheel hubs, consisting of a pawl or dog-holder adapted to be mounted on the outer end of the hub, a pawl or dog pivoted at one end to the holder to swing in the arc of a circle and provided in juxtaposition to its opposite free end with a notch or recess to engage the ordinary angular nut, and a device movable on the holder and acting on the free end of the pawl or dog to swing it inwardly into engagement with the nut, substantially as described.

2. The combination of a pawl or dog-holder adapted to be mounted on the outer end of a wheel-hub, a pawl or dog pivoted at one end to the holder to swing in the arc of a circle and at its opposite end constructed to engage an ordinary axle nut, a spring acting upon the pawl or dog to swing it outwardly from engagement with the nut, and a movable block or slide acting on the free end of the pawl or dog for swinging it inwardly against the tension of the spring and into engagement with the nut, substantially as described.

3. The combination of a slotted pawl or dog-holder adapted to be mounted on the outer end of a wheel hub, swinging pawls or dogs pivoted to the holder, provided with notched free extremities to engage an ordinary angular axle nut and swinging in the arcs of circles to and from said nut, and blocks or slides having pins extending through the slots in the holder, and adapted to be operated from the exterior thereof for moving the blocks or slides, substantially as described.

4. The combination of a slotted pawl or dog-holder adapted to be mounted on the outer end of a wheel hub, swinging pawls or dogs pivoted to the holder, springs acting on the pawls or dogs to press them in an outward direction, and blocks or slides having pins extending through the slots in the holder, and adapted to be operated from the exterior thereof for pressing the pawls or dogs inwardly to engage an axle nut for unscrewing the latter by the rotation of the wheel, substantially as described.

In testimony whereof I have hereunto set my hand in presence of two subscribing witnesses.

GEORGE H. BUTLER.

Witnesses:
LAUTY MILLER,
T. M. BUTLER.